US009734649B2

(12) United States Patent
Yoon et al.

(10) Patent No.: US 9,734,649 B2
(45) Date of Patent: Aug. 15, 2017

(54) BANKNOTE PROCESSING APPARATUS

(71) Applicants: Sungsoo Yoon, Seongnam-si (KR); Daesik Jeong, Yongin-si (KR); Sang Hwan Jang, Seoul (KR)

(72) Inventors: Sungsoo Yoon, Seongnam-si (KR); Daesik Jeong, Yongin-si (KR); Sang Hwan Jang, Seoul (KR)

(73) Assignee: Kisan Electronics Co., Ltd., Seoul (KR)

( * ) Notice: Subject to any disclaimer, the term of this patent is extended or adjusted under 35 U.S.C. 154(b) by 0 days.

(21) Appl. No.: 15/134,801

(22) Filed: Apr. 21, 2016

(65) Prior Publication Data

US 2017/0193726 A1 Jul. 6, 2017

(30) Foreign Application Priority Data

Dec. 30, 2015 (KR) ........................ 10-2015-0190181

(51) Int. Cl.
*G06K 9/74* (2006.01)
*G07D 7/121* (2016.01)

(52) U.S. Cl.
CPC .................................... *G07D 7/121* (2013.01)

(58) Field of Classification Search
CPC ........ G01J 1/42; G01J 1/58; G01J 3/02; G01J 3/0218; G01J 3/0248; G01J 3/108; G01J 3/46; G01J 3/462; G01J 3/463; G01J 3/50; G01J 3/501; G01J 3/51; G01J 3/513; G01J 3/524; G01N 2021/757
See application file for complete search history.

(56) References Cited

U.S. PATENT DOCUMENTS

| | | | | |
|---|---|---|---|---|
| 6,734,953 | B2 | 5/2004 | Numata | |
| 9,210,332 | B2 | 12/2015 | Blair | |
| 2002/0015145 | A1 | 2/2002 | Numata | |
| 2010/0102234 | A1 | 4/2010 | Hamasaki et al. | |
| 2011/0164805 | A1* | 7/2011 | Blair .................... | G06K 9/2018 382/137 |
| 2012/0269403 | A1* | 10/2012 | Blair .................... | G06K 9/2018 382/112 |
| 2013/0343652 | A1 | 12/2013 | Goto et al. | |
| 2014/0232839 | A1 | 8/2014 | Blair | |
| 2015/0310689 | A1 | 10/2015 | Parkov et al. | |

FOREIGN PATENT DOCUMENTS

| | | |
|---|---|---|
| JP | 11219459 A | 8/1999 |

* cited by examiner

*Primary Examiner* — Michael P Stafira
(74) *Attorney, Agent, or Firm* — Central California IP Group; Andrew D. Fortney

(57) ABSTRACT

A banknote processing apparatus is disclosed. The banknote processing apparatus includes a sensor unit configured to acquire image information of a banknote and project light alternately from red, green, and blue (RGB) light sources onto the banknote, and a control unit configured to (i) acquire per-color image information of the banknote for each RGB color from the image information and (ii) determine at least one of a denomination, an identification mark, an authenticity, and a fitness of the banknote based on the per-color image information.

24 Claims, 8 Drawing Sheets

(a)

(b)

BANKNOTE PROCESSING APPARATUS

CROSS REFERENCE TO PRIOR APPLICATION

This application claims the benefit of Korean Patent Application No. 10-2015-0190181, filed on Dec. 30, 2015, which is hereby incorporated by reference as if fully set forth herein. Further, research in this application is supported by a grant from the Advanced Technology Center R&D Program, funded by the Ministry of Trade, Industry & Energy of the Republic of Korea (Research ID No.: 1415140392).

BACKGROUND

Field of the Invention

The present invention relates to a banknote processing apparatus, and more particularly, to a banknote processing apparatus for determining the denomination, identification mark, fitness, and/or authenticity of a banknote.

Discussion of the Related Art

The term "banknote processing apparatus" covers a wide range of devices that count banknotes, such as a banknote counter for automatically counting a quantity of bills, a banknote sorter for sorting banknotes according to their condition and fitness for circulation, a banknote recycler, a counterfeit banknote detector, a check processing apparatus, a banknote deposit/dispensing apparatus and an automated teller machine (ATM). The banknote processing apparatus is designed to process paper money such as banknotes and/or checks. When a user places banknotes in an inlet, the banknote processing apparatus counts the banknotes one by one or sorts them according to a specific criterion, and then discharges the banknotes through an outlet, displaying the count and amount of the banknotes.

It is to be noted herein that banknotes processed in a banknote processing apparatus may be any of cash, bills, bank notes, checks, promissory notes, securities, certificates, media, paper sheets, gift certificates, coupons, tickets, label marks, identifications, and the like in the present invention.

In general, the banknote processing apparatus also determines whether an introduced banknote is authentic or fit for circulation in addition to counting banknotes. For example, the banknote processing apparatus determines whether a banknote is fit (i.e., new, worn, or damaged) or counterfeit. That is, the banknote processing apparatus may count an accurate number of banknotes corresponding to a user-requested money amount to be deposited or withdrawn or determine whether the banknotes are counterfeit, doubled, damaged, or contaminated with foreign materials in a bank office or the like. The counted banknotes may include newly issued ones, old ones, lately-printed crisp ones, wrinkled ones, folded ones, punctured ones, discolored ones, worn ones, taped ones, and the like. Typically, the banknote processing apparatus is provided with an image acquisition unit for determining the authenticity, denomination and/or fitness of a banknote as well as counting banknotes, and executes the said functions by processing image information on banknotes, acquired through the image acquisition unit.

Background art is disclosed in Korea Patent Publication Application No. 10-2007-0107331 (entitled "Paper Money Detector" and publicized on Nov. 7, 2007).

The banknote processing apparatus is equipped with a function of identifying the features or identification marks (e.g., serial numbers) of banknotes in order to count the number of the banknotes and determine the authenticity, denomination, and/or fitness of the banknotes. Conventionally, grayscale images are typically used for banknote counting or identification.

However, some nations use banknotes having almost the same bill design, of which the denominations are distinguished not by design but by color. In this case, it is difficult to identify a banknote by a grayscale image, thereby causing errors in a banknote processing apparatus using only grayscale images. In this context, sensors capable of acquiring color images have gained popularity.

Regarding identification of the serial number of a banknote, as the resolution of the acquired image of the banknote increases, the accuracy of identifying the serial number also increases, and a minimum level or threshold of resolution is identified for reliable identification. Therefore, when a grayscale image sensor is replaced with a color image sensor in the image acquisition unit, if the resolution level is lower in the color image sensor than in the grayscale image sensor, the detection performance of the banknote processing apparatus may degrade. On the contrary, if a grayscale image sensor is replaced with a color image sensor with the same resolution in the image acquisition unit, the scanning time to acquire an image and the amount of data to be processed both increase. As a result, the processing speed decreases, or a higher performance system is required, thereby increasing the fabrication cost of the apparatus.

SUMMARY

Accordingly, the present invention is directed to a banknote processing apparatus that substantially obviates one or more problems due to limitations and disadvantages of the related art.

An object of the present invention is to provide a banknote processing apparatus having improved performance (in terms of determining a denomination, an identification mark, fitness, authenticity, and the like) without decreasing the banknote processing speed or increasing fabrication costs.

Additional advantages, objects, and features of the invention will be set forth in part in the description which follows and which will, at least in part, become apparent to those skilled in the art upon examination of the following, or which may be learned from practice of the invention. The objectives and other advantages of the invention may be realized and attained by the structure(s) particularly pointed out in the written description and claims hereof as well as the appended drawings.

To achieve these objects and other advantages and in accordance with the purpose(s) of the invention as embodied and broadly described herein, a banknote processing apparatus may comprise a sensor unit configured to acquire image information of a banknote and project light alternately from red, green, and blue (RGB) light sources onto the banknote, and a control unit configured to acquire per-color image information of the banknote for each RGB color (i.e., red, green and blue) from the image information of the banknote acquired by the sensor unit, and determine at least one of a denomination, an identification mark, an authenticity, and a fitness of the banknote based on the per-color mage information.

In another aspect of the present invention, a banknote processing apparatus comprising: a sensor unit configured to acquire image information of a banknote and project light alternately from red, green, and blue (RGB) light sources onto the banknote; and a control unit configured to generate a grayscale image of the banknote with a high resolution based on per-color image information of the banknote from the sensor unit, and determine an identification mark of the banknote based on the grayscale image with the high resolution.

In another aspect of the present invention, a banknote processing apparatus comprising a sensor unit configured to acquire visible light (VL) image information and infrared (IR) image information of a banknote and project light alternately from a VL source and an IR light source onto the banknote, and a control unit configured to determine the banknote based on the VL image information and the IR image information from the sensor unit, wherein the control unit generates a single image by synthesizing the VL image information with the IR image information, and determines at least one of a denomination, an identification mark, an authenticity, and a fitness of the banknote based on the single image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle(s) of the invention. In the drawings.

DETAILED DESCRIPTION

Figure 1:
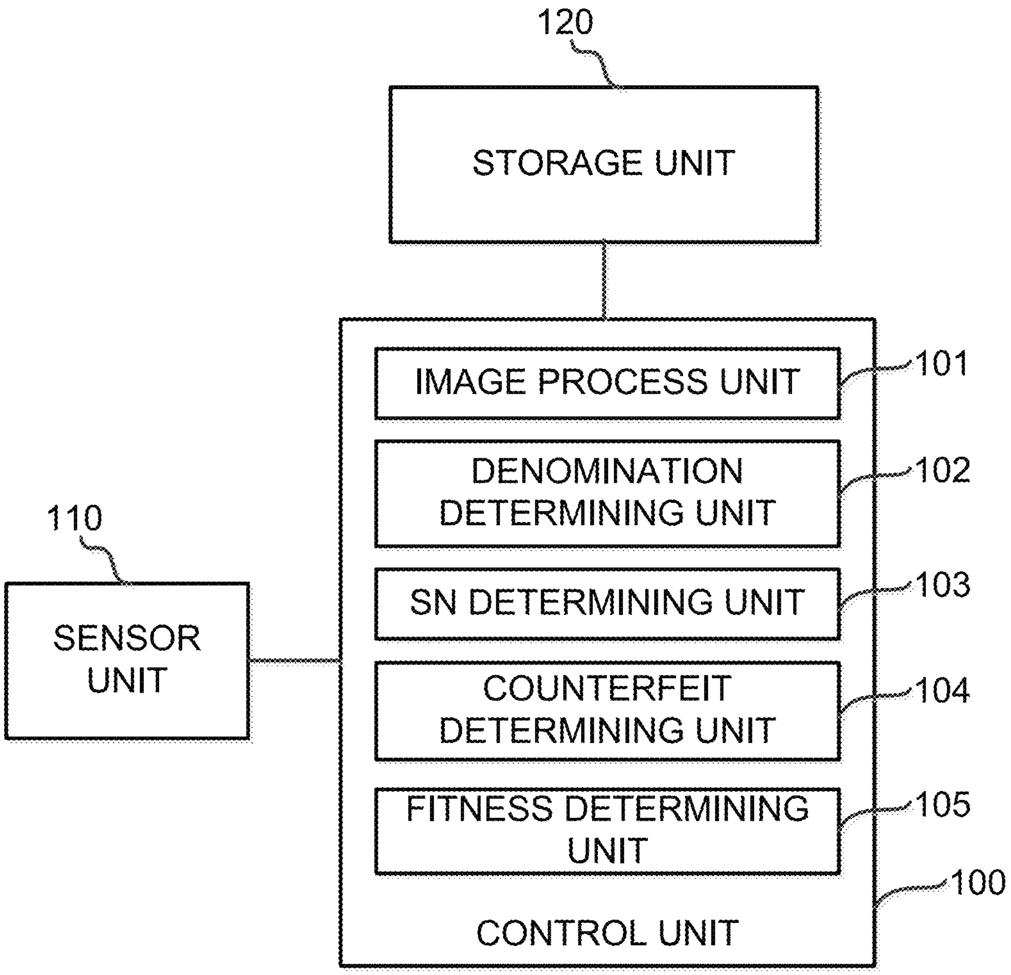
FIG. 1 is a block diagram illustrating an exemplary configuration of a banknote processing apparatus according to one or more embodiments of the present invention.

Embodiments of a banknote processing apparatus according to the present invention will be described below with reference to the attached drawings. The thicknesses of lines or the sizes of components may be shown as exaggerated in the drawings, for the clarity and convenience of description. Further, the terms as set forth herein may be defined in consideration of functions or operations in the present invention, and they may differ depending on the intent of an operator or user, depending on customs and/or practices in a given field. Accordingly, the terms should be defined based on the overall contents of the present disclosure. Particularly, herein, the term "image" generally refers to a reflected image of the front/rear surface of a banknote or a transmitted image of a banknote.

Referring to FIG. 1, a banknote processing apparatus according to one or more embodiments of the present invention may include a control unit 100, a sensor unit 110, and a storage unit 120. The control unit 100 may include an image processing unit 101, a denomination determining unit 102, a serial number (SN) determining unit 103, a counterfeit determining unit 104, and a fitness determining unit 105.

The sensor unit 110 may acquire image information (e.g., one or more images) of a banknote line by line by projecting (illuminating) light from red (R), green (G), and blue (B) light sources alternately onto the banknote. For example, the sensor unit 110 may include a plurality of red light sources, a plurality of green light sources, and a plurality of blue light sources, and a light receiving unit (e.g., a photodiode) configured to receive RGB light reflected from or transmitted through the banknote(s). That is, the RGB light sources alternately project light onto a surface of a banknote as the banknote passes through the sensor unit 110, and the light receiving unit acquires information (e.g., an image of the banknote) for each RGB color (e.g., wavelength) (that is, per-color or per-wavelength image information of the banknote). An example of the sensor unit 110 may be a commercially available contact image sensor unit.

Figure 2:
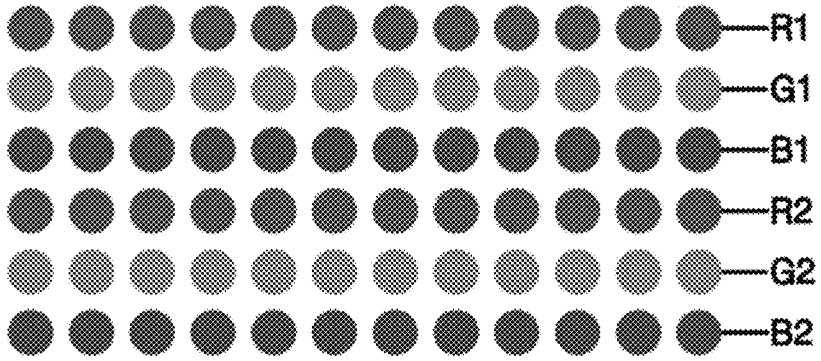
FIG. 2 is a diagram illustrating an exemplary pattern of image information acquired using the sensor unit illustrated in FIG. 1.

For example, if there are six lines of pixels in each image, and each line includes 12 pixels, the sensor unit 110 may acquire image information (e.g., an image of a banknote) in the form of a pixel array as illustrated in FIG. 2. In the example illustrated in FIG. 2, only red-wavelength information is acquired in pixel lines R1 and R2, only green-wavelength information is acquired in pixel lines G1 and G2, and only blue-wavelength information is acquired in pixel lines B1 and B2. However, other pixel array sizes and row/column arrangements (e.g., order of colors, identity of colors, combinations of colors, etc.) are possible.

The storage unit 120 stores information for each banknote type (e.g., by denomination and/or by nation). For example, the storage unit 120 may store an RGB ratio for each banknote denomination. The RGB ratio may comprise or be further classified into a ratio for determining or identifying an identification mark of a banknote, a ratio for determining a denomination of the banknote, a ratio for determining authenticity of the banknote, a ratio for determining fitness of the banknote, and the like.

Figure 4:
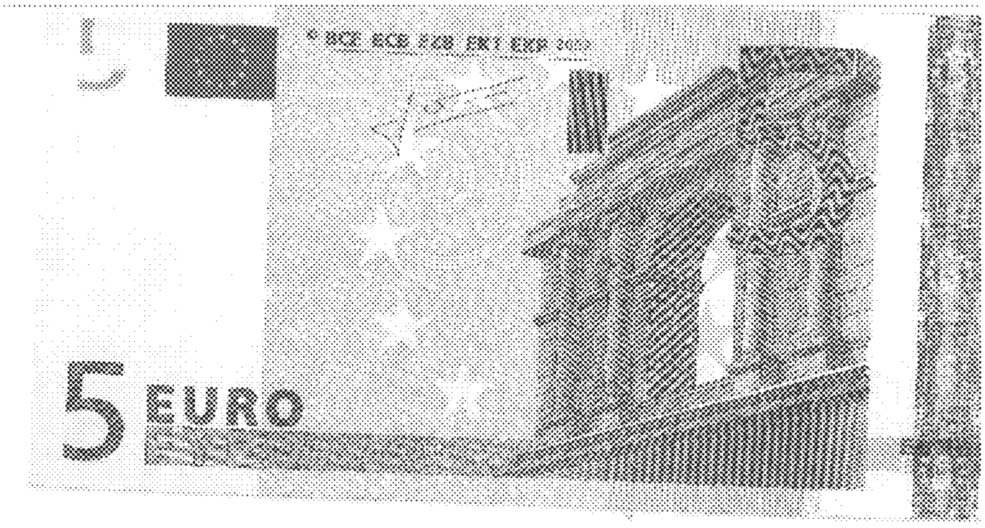
FIG. 4 is a view illustrating a general color image of a banknote.
Figure 5:
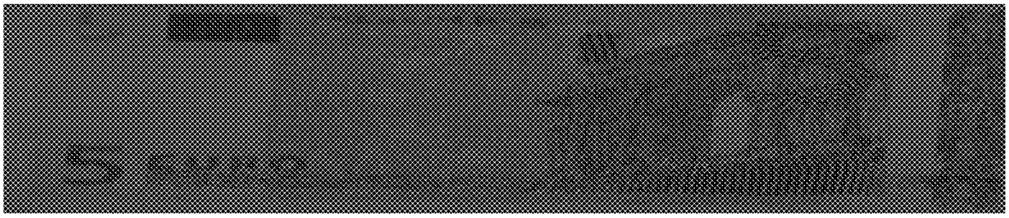
FIG. 5 is a view illustrating an exemplary per-color image according to one or more embodiments of the present invention for the banknote image illustrated in FIG. 4.

The control unit 100 may acquire (e.g., obtain or extract) per-color or per-wavelength image information of the banknote from the image information (e.g., color images) of the banknote from the sensor unit 110. That is, if only information corresponding to the pixel lines R1 and/or R2 illustrated in FIG. 2 is obtained, the control unit 100 may acquire red image information of the banknote. However, since information corresponding to red lines is ⅓ of the total image information illustrated in FIG. 2, the per-color or per-wavelength image information may have a resolution of ⅓ of the resolution of an image in which all pixels have all 3 RGB colors (e.g., compare the image in FIG. 5 with the image in FIG. 4) in such embodiments of the present invention.

Figure 7:
FIGS. 7, 8, 9, and 10 are views illustrating a banknote in various stages of an exemplary method of identifying a banknote using the exemplary banknote processing apparatus illustrated in FIG. 1.
Figure 8:
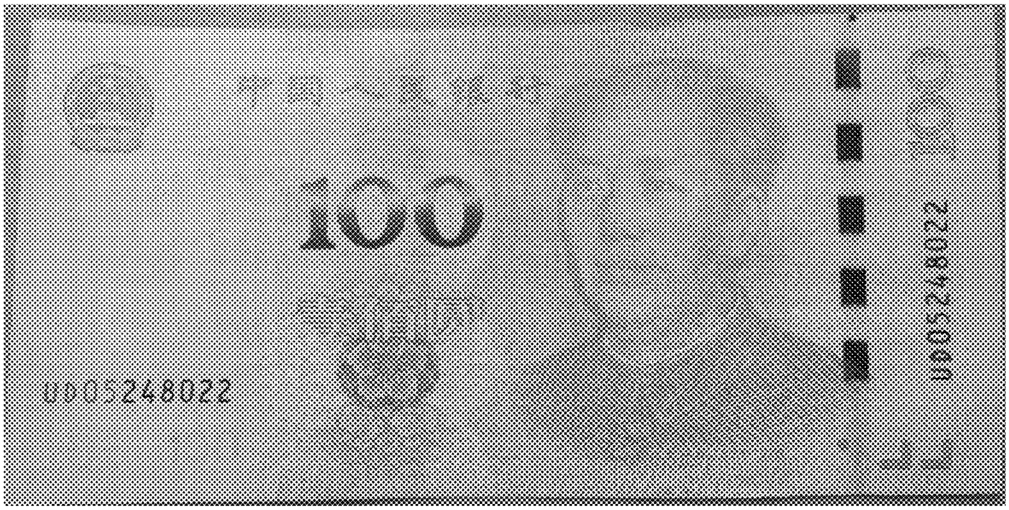
Figure 9:
Figure 10:

The control unit 100 may identify the banknote (that is, determine the denomination, identification mark, authenticity, and/or fitness of the banknote) based on the per-color or per-wavelength image information. That is, as illustrated in FIGS. 7 to 10 (FIG. 7 illustrates an RGB color image of a banknote, FIG. 8 illustrates a red mono image of the banknote, FIG. 9 illustrates a green mono image of the banknote, and FIG. 10 illustrates a blue mono image of the banknote), the banknote has different image features in different RGB color images, and objects printed on the banknote may differ in brightness or the like depending on the color (e.g., wavelength) of light with which it is irradiated. Therefore, the banknote identification performance of the apparatus 100 (FIG. 1) may increase, and the denomination, identification mark, authenticity, and/or fitness of the banknote may be determined as will be described later, using the per-color or per-wavelength image information of the banknote. For example, per-color average histogram information of a reference banknote may be stored in the storage unit 120, and the denomination, authenticity, identification mark and/or fitness of an irradiated or imaged banknote may be determined by comparing per-color average histogram information of the irradiated or imaged banknote with the per-color average histogram information of the reference banknote.

Specifically, the denomination determining unit 102 of the control unit 100 may determine the denomination of a banknote (e.g., 10000 won, 100 yuan, or 5 dollars) based on per-color or per-wavelength image information of the banknote. That is, a 100-yuan bill as illustrated in FIGS. 7 to 10 has Red On/Off, Green On/Off, and Blue On/Off features (or combinations thereof, like Red Off/Green On/Blue On) for respective RGB light sources, and since banknotes are printed in predetermined standard colors, these features of a banknote may be analyzed in advance. Accordingly, the denomination determining unit 102 may determine the denomination of the banknote based on the per-color or per-wavelength image information of the banknote (e.g., by comparing the brightness of the per-color or per-wavelength images with those of one or more corresponding standards or one or more average histograms).

Meanwhile, compared to a general grayscale image, each per-color or per-wavelength image based on corresponding per-color or per-wavelength image information as described above has a resolution of ⅓ with respect to the total number of pixels in the corresponding RGB image. However, because the denomination of a banknote may be determined by comparing per-color or per-wavelength images, instead of identifying characters on the banknote or the like, the denomination determination performance may not degrade, despite the resolution being reduced by ⅔. Rather, the use of color information may be favorable for denomination determination. Further, the amount of image information acquired by the sensor unit 110 decreases by ⅔ relative to a full RGB color image (for an equal total number of pixels). Thus, even though a color image is acquired, the processing speed may not decrease, and the manufacturing cost may not increase.

However, if a high-resolution image is needed or desired for determination of the denomination, identification mark, authenticity, and/or fitness of the banknote, the control unit 100 may acquire (e.g., obtain or generate) a high-resolution image by post-processing the per-color or per-wavelength image information from the sensor unit 110.

In one specific example, the image processing unit 101 of the control unit 100 may fill empty information in the per-color or per-wavelength image information (that is, information corresponding to the pixels of the other colors) with estimates (e.g., estimated values) of the information corresponding to the per-color or per-wavelength image information. That is, as illustrated in FIGS. 2, 3, 5, and 6, the red image information acquired by the control unit 100 has only color information (i.e., red color information) from red pixel lines, without color information from green pixel lines or blue pixel lines. Accordingly, the image processing unit 101 may fill blank or empty color information for the pixels of the green and blue pixel lines in the red color image with estimates of the color information corresponding to the red pixels. For example, in an image of a first color, the image processing unit 101 may determine or estimate a color value of an empty, blank or zero value pixel of a second or third color to be the same as the color value of a pixel of the first color that is closest to the empty, blank or zero value pixel. That is, the estimated values of the pixels in line RE1 of FIG. 3 (i.e., corresponding to the pixels in line G1 of FIG. 2) may be determined to be the color values of the pixels in line R1, and the estimated value of the pixels in line RE2 of FIG. 3 (i.e., corresponding to the pixels in line B1 of FIG. 2) may be determined to be the color values of the pixels in line R2. In other words, when red image information is acquired, only the color values of the red pixels (e.g., in lines R1 and R2) are acquired without acquiring the color values of the green and blue pixels (e.g., in lines G1, B1, G2, and B2). Then, the image is reconfigured by estimating the color values of the pixels in lines G1, B1, G2 and B2 to be the color values of the red pixels closest to them. As a consequence, the resolution of each per-color image based on per-color image information may be increased.

Figure 3:
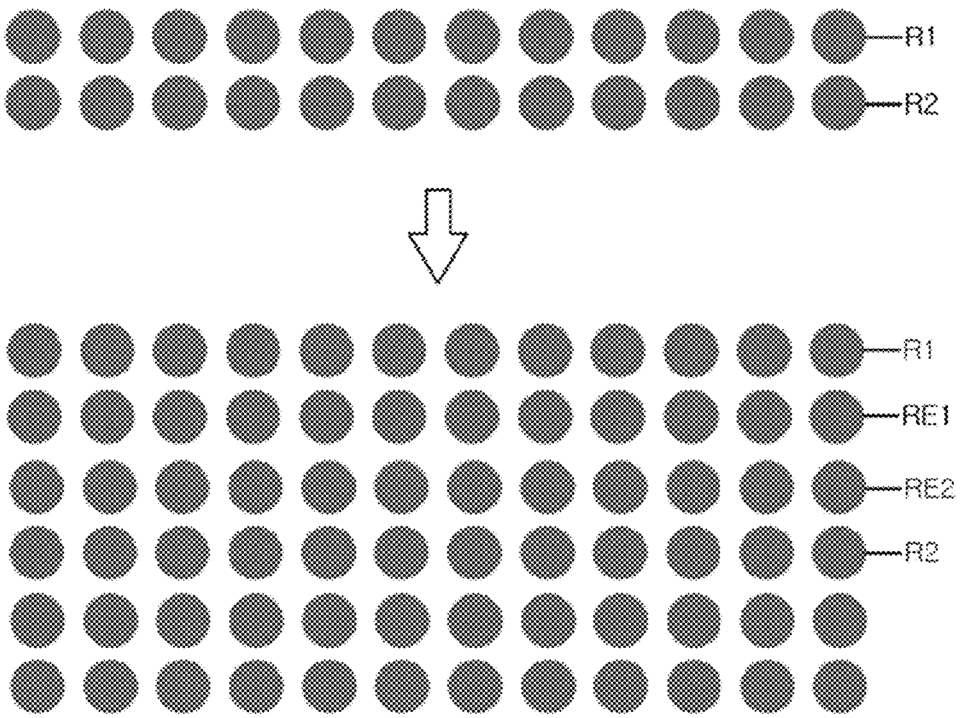
FIG. 3 is a diagram illustrating an increase in the resolution of an exemplary image on a color (e.g., wavelength) basis using the exemplary banknote processing apparatus illustrated in FIG. 1.
Figure 6:
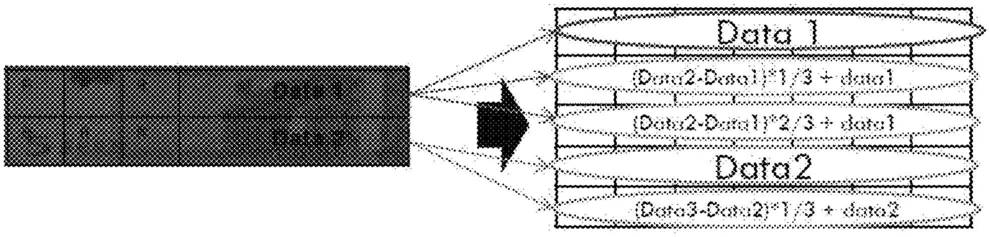
FIG. 6 is a diagram illustrating an improvement in the resolution of the exemplary per-color image illustrated in FIG. 5.

Also, the image processing unit 101 may calculate the estimates by an interpolation method that considers the positions of the red pixels. As illustrated in FIGS. 3 and 6, a red color estimate of the pixels in line RE1 may be calculated by interpolating the color values of the pixels in lines R1 and R2. For example, the red color estimate of the pixels in line RE1 may be calculated by adding ⅔ of the color value of one or more pixels (e.g., the closest pixel) in line R1 and ⅓ of the color value of one or more pixels (e.g., the closest pixel) in line R2. In a further embodiment, the color value of the closest pixel in the closest line(s) may be interpolated by adding ½ of the color value of the closest pixel in the closest line to ¼ of the color value of each of the two next closest pixels in the closest line, except that when the pixel is at the end of a line, the color value of the closest pixel in the closest line(s) may be interpolated by adding ⅔ of the color value of the closest pixel in the closest line to ⅓ of the color value of the next closest pixel in the closest line. Also, the red color estimates of the pixels in line RE2 may be calculated by adding ⅔ of the color values of the pixels in line R2 to ⅓ of the color values of the pixels in line R1. Estimates may be added to green mono image information and blue mono image information in the same manner as estimates are added to the red mono image information, which will not be described in detail herein to avoid redundancy. As described above, a smoother image may be acquired by such interpolation, and determination errors may be reduced as a result.

Beside the interpolation methods described above by way of example, any of quadratic interpolation, Newtonian interpolation, Lagrangian interpolation, regression analysis-based interpolation, and the like may be also used.

Meanwhile, the control unit 100 may generate a grayscale image of the banknote based on the afore-described per-color or per-wavelength image information, and determine an identification mark of the banknote based on the generated grayscale image. For example, the image processing unit 101 may generate a grayscale image of the banknote based on the individual or combined per-color or per-wavelength image information, and the SN determining unit 102 of the control unit 100 may determine an SN of the banknote based on the grayscale image. That is, the SN determining unit 102 may determine the SN of the banknote by image processing techniques such as identifying characters by extracting boundaries from the grayscale image. However, the present invention is not limited to this specific scheme, and thus the SN determining unit 102 may identify an SN of a banknote in various ways.

To increase the SN identification performance of the apparatus 100, the image processing unit 101 may generate a grayscale image with an increased resolution using the afore-described per-color or per-wavelength image information. Alternatively, the image processing unit 101 may generate a grayscale image of the banknote based on image information of the banknote, acquired through the sensor unit 110 as in another embodiment of the present invention.

Figure 11:
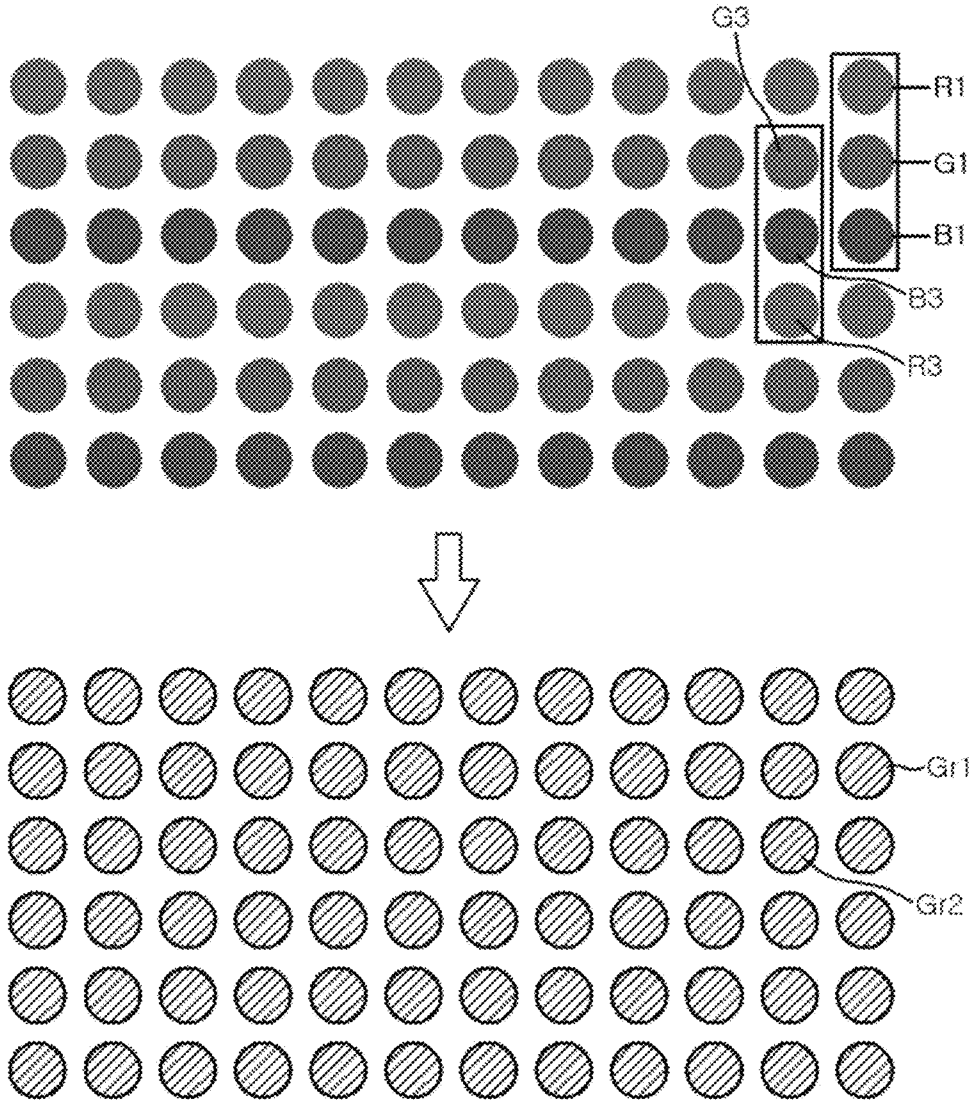
FIGS. 11 and 12 are diagrams illustrating an exemplary method for generating a grayscale image in a banknote processing apparatus according to one or more other embodiments of the present invention.
Figure 12:
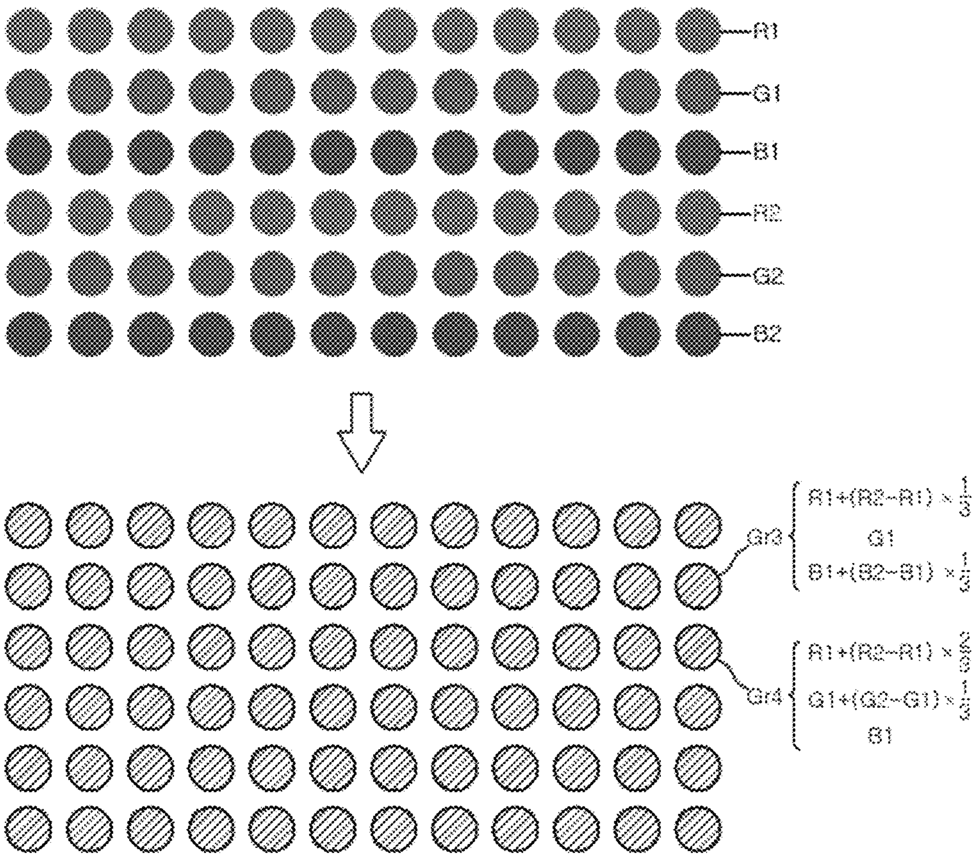

That is, as illustrated in FIGS. 11 and 12, the image processing unit 101 may generate a grayscale image of the banknote by reconfiguring each pixel of the color image information of the banknote on a gray scale. As illustrated in FIG. 11, for example, the image processing unit 101 may calculate a grayscale value of the pixels in a color image based on the color values of a given pixel and a pixel adjacent to the given pixel. For example, the grayscale value of the pixel Gr1 (corresponding to pixel G1) may be calculated based on the color values of the pixels R1, G1, and B1, and the grayscale value of pixel Gr2 (corresponding to pixel B3) may be calculated based on the color values of pixels G3, B3, and R3. In other words, in case of the pixel G1, although only green color information is acquired during acquisition of image information on the pixel G1 through the sensor unit 110, the grayscale value of the pixel may be calculated on the assumption that the pixel has the same red value and blue value as those of the adjacent red and blue pixels. While an error may occur due to banknote movement through the sensor unit 110, the influence of the banknote movement may be minimized by designing relatively narrow scanning gaps between the red, green, and blue light sources and/or the corresponding light sensors.

As illustrated in FIG. 12, the image processing unit 101 may also determine or calculate the grayscale value of a given pixel based on the color value of the given pixel and the estimated values of pixels of other colors adjacent to the given pixel by interpolation. For example, the grayscale value of the pixel Gr3 (corresponding to pixel G1) may be based on the color value of the pixel G1 and the estimated value of pixels of other colors adjacent to the position of the pixel Gr3 (G1) (e.g., the estimated red color value of the pixel Gr3 may be the sum of the color value of R1 and ⅓ of the color value of R2–R1, and the blue color estimate of the pixel Gr3 may be the sum of the color value of B1 and ⅓ of the color value of B2–B1). Alternatively, the estimated red color value of the pixel Gr3 may be the sum of the color value of R1 and ⅓ of the color value of R2, and the blue color estimate of the pixel Gr3 may be the sum of the color value of B1 and ⅓ of the color value of B2. The grayscale value of the pixel Gr4 (corresponding to pixel B1) may be the sum of the estimated red color value of the pixel Gr4 (e.g., the sum of the color value of R1 and ⅔ of the color value of R2–R1), the estimated green color value of the pixel B1 (e.g., the sum of the color value of G1 and ⅓ of the color value of G2–G1), and the color value of B1.

In this manner, a smoother image may be acquired by interpolation, and determination errors may be reduced as a result. In addition to such interpolation methods, any of quadratic interpolation, Newtonian interpolation, Lagrangian interpolation, regression analysis-based interpolation, and the like may be also used.

That is, since a grayscale image generated in this manner has a higher resolution than the corresponding per-color or per-wavelength images, the reliability of identifying an identification mark of a banknote increases. For example, if each per-color or per-wavelength image has a resolution of 50 dpi, the resolution of the grayscale image generated by the above-described method is arithmetically 150 dpi.

Alternatively, when generating a grayscale image, the image processing unit 101 may read an RGB ratio corresponding to the determined denomination of the banknote from the storage unit 120 and generate the grayscale image based on the RGB ratio. For example, when the apparatus determines a particular denomination for an irradiated or imaged banknote, an RGB ratio such as (0.2988*R+0.5870*G+0.1140*B) for the corresponding authentic banknote may be read so that the generated grayscale image for the irradiated or imaged banknote may have efficient and/or effective gray values. That is, an RGB ratio for identification marks of various authentic banknotes may be different for each banknote denomination. Since authentic banknotes are standardized, this information (e.g., RGB ratios) may be analyzed in advance and used to identify certain features of banknotes. Thus, when the image processing unit 101 generates a grayscale image by reading an RGB ratio corresponding to a denomination from the storage unit 120, the determination performance of the SN determining unit 102 may increase. Further, the RGB ratio read from the storage unit 120 may be a specified value for identification mark determination. As described before, the storage unit 120 may store RGB ratios for fitness determinations, and separately, different RGB ratios for identification mark determinations.

Meanwhile, although the denomination determining unit 102 may determine the denomination of a banknote, the component responsible for determining a banknote denomination is not limited to the denomination determining unit 102. Therefore, the result of the denomination determination may be received from another component of the banknote processing apparatus. The denomination determination for the banknote may comprise determination of the national denomination of the banknote (i.e., KRW, EUR, CNY, USD, or the like), the kind or amount of the banknote in one country, or the direction of the banknote such as front, rear, left, or right.

In one or more embodiments of the present invention, the control unit 100 may identify another identification mark (e.g., characters such as "FIVE DOLLARS") in addition to the above-described SN.

The control unit 100 may determine whether the banknote is counterfeit or fit (e.g., for continued circulation) based on the afore-described RGB per-color or per-wavelength image information. Specifically, the counterfeit determining unit 104 of the control unit 100 may determine whether the banknote is counterfeit by detecting a counterfeit element from one or more per-color or per-wavelength images. That is, as illustrated in FIGS. 7 to 10, since the brightness of a counterfeit element (i.e., a security element printed on the banknote for counterfeit detection) on the banknote may be different for each color (or wavelength), the counterfeit determining unit 104 may detect the counterfeit element and determine whether the banknote is counterfeit based on features of or characteristics in one or more of the per-color images.

For example, a counterfeit element of a banknote may be printed in an optically variable ink (OVI), and the OVI may be perceived as a different color to human eyes, depending on the illuminating or reflecting angle of light. Thus, it may be determined easily whether the banknote is counterfeit when the banknote is printed with an OVI. However, if the banknote is imaged in a single grayscale image, it may be difficult to determine accurately whether a color change characteristic of an OVI occurs. In contrast, the counterfeit determining unit 104 according to embodiments of the present invention is capable of detecting an OVI from per-color or per-wavelength image information. For example, when the banknote is printed with an OVI, the color strength of one or more colors may vary by more than a threshold amount from the reference value(s) in one or more locations on the banknote. Accordingly, a color change may be determined accurately, which makes it possible to determine whether the banknote is counterfeit.

Besides, the sensor unit 110 may further include an infrared (IR) light source configured acquire IR image information of a banknote. Optionally, the infrared (IR) light source may irradiate the banknotes with IR light, and the sensor unit 110 may further include an IR detector configured acquire the IR image information. The counterfeit determining unit 104 may determine whether the banknote is counterfeit by further detecting a counterfeit element in the IR image information. For example, the counterfeit determining unit 104 may detect a counterfeit element by dimension analysis using or within the dimensions and/or values of features at each wavelength. Herein, the IR sensor may be a reflective type, a transmissive type, or both.

The image processing unit 101 may generate an image for use in determining the fitness of the banknote by reading from the storage unit 120 an RGB ratio of an authentic banknote corresponding to the determined denomination of the banknote, and the fitness determining unit 105 of the control unit 100 may determine whether the banknote is fit (e.g., for continued circulation) based on the image. That is, similarly to a grayscale image for SN identification, there may be an RGB ratio (e.g., of authentic banknotes deemed fit for circulation) for each banknote denomination that can be used for fitness determinations, and the image processing unit 101 may generate an image for use in determining the fitness of the banknote by reading the RGB ratio(s) for the determined denomination of the banknote from the storage unit 120 (e.g., the image processing unit 101 may generate a green image and a red-blue image for EUR, and a red-green image and a blue image for USD). As a consequence, the fitness determination performance of the fitness determining unit 105 may increase from the use of the present per-color imaging and processing apparatus/system.

Also, although the denomination determining unit 102 may determine the denomination of the banknote, the component responsible for determining a banknote denomination is not limited to the denomination determining unit 102. Therefore, the result of the denomination determination may be received from another component of the banknote processing apparatus. The denomination determination for the banknote may comprise a determination of the national denomination of the banknote (e.g., KRW, EUR, CNY, USD, or the like), the kind or amount of the banknote in one country, or the direction of the banknote such as front, rear, left, or right.

As described above, since RGB color information characteristic of each denomination is used, one may exclude or identify a specific color in a banknote image and develop applications using feature information, for example by detecting a color value at a specific position related to a feature in the banknote. For example, when an SN is printed on a red background of a banknote, the banknote may be processed using only green and blue image information, which increases the efficiency of the method.

Figure 13:
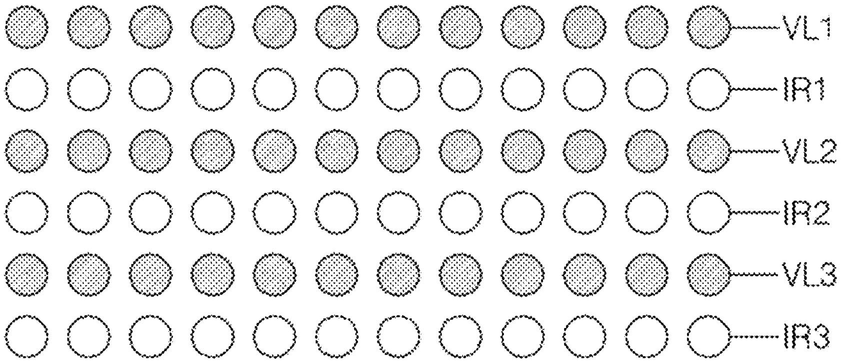
FIG. 13 is a diagram illustrating an exemplary pattern of an image acquired in a banknote processing apparatus according to one or more other embodiments of the present invention.
Figure 14:
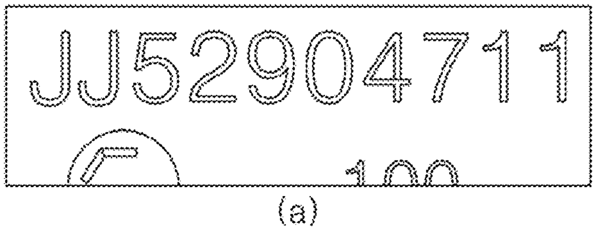
FIG. 14 is a diagram illustrating an exemplary part of a banknote in an exemplary method of identifying a banknote, in relation to the exemplary image illustrated in FIG. 13.
Figure 14:
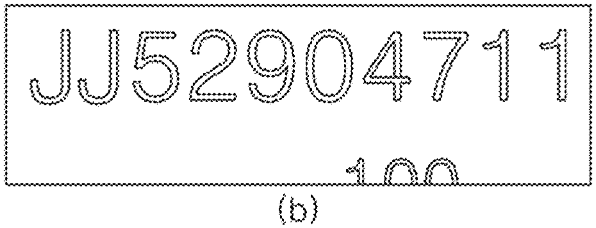

With reference to FIGS. 13 and 14, a banknote processing apparatus according to one or more other embodiments of the present invention will be described below.

In other embodiments of the present invention, the sensor unit 110 may acquire visible light (VL) image information and IR image information by alternately projecting a VL source and an IR light source onto the banknote. For example, the sensor unit 110 may include a plurality of VL sources and a plurality of IR light sources, and a light receiving unit (e.g., a photodiode) configured to receive light reflected by and/or transmitted through the banknote.

That is, the VL source and the IR light source project light alternately onto a surface of a banknote while the banknote passes through the sensor unit 110, and the light receiving unit receives the reflected or transmitted light alternately. In one embodiment, the light receiving unit receives the light line by line, but in another embodiment, the light receiving unit receives all lines of the VL or IR light simultaneously. Thus, VL image information and/or IR image information may be acquired by acquiring VL information and IR information on a pixel line basis. Herein, the sensor unit 110 may transmit the VL by simultaneously operating the RGB (red, green and blue) light sources, or the VL image information may be acquired by synthesizing (or overlaying) the red, green and blue per-color or per-wavelength image information (which may be acquired by alternately operating the RGB light sources as illustrated in FIG. 2). For example, if there are six lines, each line having 12 pixels, the sensor unit 110 may acquire VL and IR image information in the form of a pixel array as illustrated in FIG. 13. That is, as illustrated in FIG. 13, VL image information (e.g., brightness [luminance] information) of a banknote is acquired from lines of pixels VL1, VL2, and VL3, and IR image information of the banknote is acquired from lines of pixels IR1, IR2, and IR3. While each of the lines VL1, VL2, and VL3 is shown as a single line in FIG. 13 for the convenience of description, the line covers both a case in which the RGB light sources simultaneously project light and a case in which the RGB light sources alternately project light, and the each color of light is combined. In the latter case, for example, each piece of image information may be acquired on a line basis by projecting light alternately in the order of VL1(R1→G1→B1)→IR1. Also, while not shown in FIG. 13, each of IR line images IR1, IR2, IR3, . . . may include an IR reflected line image and/or an IR transmitted line image.

The control unit 100 may generate a single image by synthesizing (or overlaying) the VL image information and the IR image information of the banknote. That is, the VL image information may include only brightness information for the VL pixels, without including brightness information for the IR pixels. However, since the IR image information is also related to brightness, the VL image information and the IR image information may be synthesized into an image related to the brightness of the banknote in correspondence with the entire pixel array in the image acquisition unit. Herein, since the VL image information and the IR image information may differ in scale, the control unit 100 may synthesize the VL image information with the IR image information by matching the scales of the VL and IR image information.

The control unit 100 may determine an identification mark of the banknote based on the generated image. The banknote has various patterns in its background, and it may be difficult to determine an identification mark (e.g., an SN) of the banknote in view of the background. However, as illustrated in FIG. 14 (a VL image in [a] and an IR image in [b]), the patterns in the background of the banknote do not necessarily react to IR light, but the identification mark of the banknote reacts to IR light in many cases. Therefore, a more elaborate image of the identification mark may be obtained using an IR image, thereby increasing the performance of the banknote processing apparatus in identifying an identification mark.

Also, the storage unit 120 may store, for each denomination and/or banknote, information indicating whether an identification mark of an authentic banknote is responsive to IR light (i.e., "IR response information"). The control unit 100 may read the IR response information from the storage unit 120. When the identification mark is responsive to IR light, the control unit 100 may generate a single image of the banknote having an IR-reactive identification mark by synthesizing the VL image information with the IR image information.

In one or more other embodiments, the IR sensor may be a responsive type, a transmissive type, or both.

As is apparent from the foregoing description, the banknote processing apparatus has improved performance by acquiring image information of a banknote for a plurality of RGB colors (or wavelengths) and determining the denomination, identification mark, fitness, and/or authenticity of the banknote based on the image information.

Since the banknote processing apparatus acquires high-resolution image information by post-processing the color image information acquired through an image acquisition unit, its performance is improved.

Further, the banknote processing apparatus has improved performance by synthesizing VL image information (e.g., reflected or transmitted VL image information) with IR image information (e.g., reflected or transmitted IR image information) and identifying a banknote based on the synthesized image information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A banknote processing apparatus comprising:

a sensor unit configured to acquire image information of a banknote and project light alternately from red, green, and blue (RGB) light sources onto the banknote; and a control unit configured to (i) acquire per-color image information of the banknote for each RGB color from the image information of the banknote, (ii) determine a denomination of the banknote based on the per-color image information, the per-color image information having a resolution, (iii) reconfigure the per-color image information for each RGB color to generate image information with a higher resolution than the resolution of the per-color image information, and (iv) determine an identification mark, authenticity or fitness of the banknote based on the image information with the higher resolution.

2. The banknote processing apparatus according to claim 1, wherein the image information resolution, image information with the higher resolution includes visible light (VL) image information of the banknote generated by synthesizing the per-color image information for each RGB color.

3. The banknote processing apparatus according to claim 1, wherein the image information with the higher resolution includes a grayscale image of the banknote, and the control unit identifies an identification mark of the banknote based on the grayscale image.

4. The banknote processing apparatus according to claim 1, further comprising a storage unit configured to store information for each banknote denomination, including RGB ratio information for a plurality of authentic banknotes.

5. The banknote processing apparatus according to claim 4, wherein the control unit reads an RGB ratio corresponding to a determined denomination of the banknote from the storage unit.

6. The banknote processing apparatus according to claim 3, further comprising a storage unit configured to store information for each banknote denomination, wherein the control unit generates the grayscale image by reading an RGB ratio corresponding to a determined denomination of the banknote from the storage unit.

7. The banknote processing apparatus according to claim 1, further comprising a storage unit configured to store per-color average histogram information of a plurality of reference banknotes, and the control unit determines the banknote by comparing the average histogram information of the per-color image information of the banknote with the per-color average histogram information of one or more of the reference banknotes.

8. The banknote processing apparatus according to claim 1, wherein for each RGB color, the control unit estimates a color value of the other colors at positions corresponding to one or more pixels in the per-color image information, and adds the color value to the per-color image information.

9. The banknote processing apparatus according to claim 8, wherein the per-color image information comprises a color image comprising a plurality of pixels including the one or more pixels, and the control unit estimates the color value of the other colors as a color value of a closest pixel of the one or more pixels.

10. The banknote processing apparatus according to claim 8, wherein the one or more pixels comprises a plurality of pixels having a first color, and the control unit estimates the color value by an interpolation method that considers positions of the plurality of pixels having the first color.

11. The banknote processing apparatus according to claim 1, wherein the sensor unit further includes an infrared (IR) light source and acquires image information of the banknote by alternately projecting light from the red, green, blue and IR light sources, and the control unit further acquires IR image information of the banknote from the image information of the banknote, synthesizes the per-color image information with the IR image information, and determines the authenticity, identification mark, and/or fitness of the banknote based on the synthesized image.

12. A banknote processing apparatus comprising:

a sensor unit configured to acquire per-color image information of a banknote and project light alternately from red, green, and blue (RGB) light sources onto the banknote, the per-color image information having a resolution; and a control unit configured to generate a grayscale image of the banknote with a second resolution higher than the resolution of the per-color image information by reconfiguring the per-color image information for each RGB color of the banknote, and determine an identification mark of the banknote based on the grayscale image.

13. The banknote processing apparatus according to claim 12, wherein the per-color image information of the banknote comprises a plurality of lines, each line comprises a plurality of pixels, and the control unit calculates a grayscale value of the pixels based on a first color value of the pixels of a first color and a second color value of an adjacent pixel of a different color.

14. The banknote processing apparatus according to claim 12, wherein the per-color image information of the banknote comprises a plurality of lines, each line comprises a plurality of pixels, and the control unit calculates a grayscale value of the pixels based on a first color value of the pixels of a first color and an interpolated value of pixels of another color.

15. The banknote processing apparatus according to claim 12, further comprising a storage unit configured to store information for each banknote denomination, including RGB ratio information for a plurality of authentic banknotes, wherein the control unit generates the grayscale image by reading an RGB ratio corresponding to an authentic banknote corresponding to the irradiated or imaged banknote from the storage unit.

16. A banknote processing apparatus comprising:

a sensor unit configured to acquire visible light (VL) image information and infrared (IR) image information of a banknote and project light alternately from a VL source and an IR light source onto the banknote, the VL image information and the IR image information having a resolution; and a control unit configured to determine the banknote based on the VL image information and the IR image information from the sensor unit, wherein the control unit generates a single image with a higher resolution than the resolution of the VL image information and the IR image information by synthesizing the VL image information with the IR image information and matching scales of the VL image information and IR image information, and determines an identification mark of the banknote based on the single image.

17. The banknote processing apparatus according to claim 16, further comprising a storage unit configured to store information for each banknote denomination, including IR reactivity information indicating whether an identification mark of each of a plurality of authentic banknotes reacts to IR light, wherein the control unit reads from the storage unit the IR reactivity information, and when the identification mark of the irradiated or imaged banknote reacts to IR light, the control unit generates the single image by synthesizing the VL image information with the IR image information.

18. The banknote processing apparatus according to claim 4, wherein the RGB ratio information comprises a ratio for determining the identification mark of the authentic banknote, a ratio for determining the denomination of the authentic banknote, a ratio for determining the authenticity of the authentic banknote, or a ratio for determining the fitness of the authentic banknote.

19. The banknote processing apparatus according to claim 16, wherein the sensor unit is configured to acquire VL image information by simultaneously operating red, green and blue (RGB) light sources, and the VL image information and the IR image information differ in scale.

20. The banknote processing apparatus according to claim 11, wherein the control unit determines the authenticity of the banknote by detecting a counterfeit element from the VL image information and/or the IR image information, or the fitness of the banknote by reading from a storage unit an RGB ratio of an authentic banknote corresponding to the determined denomination of the banknote.

21. The banknote processing apparatus according to claim 1, wherein the control unit detects a counterfeit element from the per-color image information and determines the authenticity of the banknote based on features in one or more of the per-color images, or the fitness of the banknote by generating an image for use in determining the fitness of the banknote.

22. The banknote processing apparatus according to claim 1, wherein the control unit is configured to reconfigure the per-color image information for each RGB color by a process comprising (i) estimating color values of pixels of first and second RGB colors adjacent to a pixel of the third RGB color to be the color value of the pixel of the third RGB color, or (ii) calculating a grayscale value of the pixels in a first RGB color image from the color values of one of the pixels of the first RGB color and pixels of the second and third RGB colors adjacent to the one pixel.

23. The banknote processing apparatus according to claim 1, wherein the control unit is configured to reconfigure the per-color image information for each RGB color by a process comprising filling blank or empty color information for pixels of first and second RGB colors with estimates of the color information corresponding to adjacent pixels of the third RGB color.

24. The banknote processing apparatus according to claim 1, further comprising a storage unit configured to store information for each banknote denomination, including RGB ratio information for a plurality of authentic banknotes, wherein the control unit generates an image for use in determining the authenticity or fitness of the banknote by reading an RGB ratio corresponding to an authentic banknote corresponding to the determined denomination of the banknote from the storage unit.

* * * * *